United States Patent [19]

McShane

[11] 3,979,565

[45] Sept. 7, 1976

[54] METAL ENCLOSED TRANSDUCER ASSEMBLY

[75] Inventor: James L. McShane, Pittsburgh, Pa.

[73] Assignee: Westinghouse Electric Corporation, Pittsburgh, Pa.

[22] Filed: Aug. 11, 1975

[21] Appl. No.: 603,708

[52] U.S. Cl. .............................. 179/110 A; 310/8.2; 310/9.1; 340/10
[51] Int. Cl.² ........................................ H04R 17/10
[58] Field of Search ................... 179/110 A, 110 D; 340/10; 310/8.2, 8.3, 9.1, 9.5

Primary Examiner—George G. Stellar
Attorney, Agent, or Firm—C. M. Lorin

[57] ABSTRACT

A thick layer of epoxy resin is used to bond together the piezoelectric member and a stainless steel cap to form an acoustic transducer having a broad frequency response, and specific assembling steps are taken to manufacture the transducer with good reproducibility of the characteristics.

22 Claims, 12 Drawing Figures

METAL ENCLOSED TRANSDUCER ASSEMBLY

BACKGROUND OF THE INVENTION

The invention in general relates to acoustic transducers and more particularly to an acoustic transducer of predetermined acoustic characteristics.

The active element of an acoustic transducer generally comprises a piezoelectric member having connected thereto electrical leads. Such active element can be given precise characteristics with regard to transmission and/or reception of acoustical waves. However, due to size and fragility the piezoelectric member must be embodied within a transducer assembly to form a protected unitary device which can be used, mounted or positioned as part of a practical acoustic equipment, for instance in a flowmeter.

The problem with the transducer assemblies of the prior art is to keep the good electrical and acoustical qualities of the components, and to be able to obtain a unitary device which can be manufactured easily, at minimum cost and with good reproducibility.

It is known from U.S. Pat. No. 3,771,117 of T. N. Shaffer et al, a patent assigned to the same assignee as the assignee of this application, to mount a transducer assembly within a holder, or casing, having a closed end and an open end, the closed end serving as an acoustic window for the transducer assembly, and to position the transducer assembly with force within the holder against the inside surface of such acoustic window. In order to obtain a tighter and more unitary transducer assembly, the above patent of Shaffer proposes to use an encapsulating elastomeric material surrounding the active element and held by a backing organ against the assembly holder and contained therein.

While the arrangement of the Shaffer patent is well suited for the particular conditions of applications defined therein, the present invention aims at providing a more integrated type of transducer, without the need for any springs to hold the transducer assembly in effective operative condition within the holder, and which comes as a unit with the casing itself. In addition, such unitary encapsulated transducer assembly must have predetermined acoustic characteristics and be capable of being reproduced by a manufacturing process with identical acoustic characteristics and the same overall quality.

SUMMARY OF THE INVENTION

The invention, from one aspect thereof, resides in a multilayer acoustic transducer comprising a piezoelectric member and at least two acoustic layers including the acoustic window of a metal enclosure protecting the transducer and an internal layer of plastic material uniting the piezoelectric member and the metal enclosure, wherein the thicknesses of said member and of the two layers are substantially equal to the half wavelength of the acoustic wave and wherein each of said layers and piezoelectric member exhibits a peak frequency slightly different from the two other peak frequencies, the central peak frequency being the one of the acoustic window of the metal enclosure, whereby the multilayer transducer has a broadened frequency response characteristic.

The invention, from another aspect thereof, resides in a transducer having an active portion mounted at the end of a support with the electrical leads passed through the support, the active portion and the support end being surrounded with epoxy resin, wherein a metal casing is provided which is integral with the epoxy resin, the active assembly and the support. The epoxy resin is either poured and cured in situ between the back of the window of the metal casing and the active member, as well as laterally of the active transducer assembly which may include a backing member, or the resin is first cured around the assembly on the support, then machined and joined by bonding to the casing before welding of the support to the casing.

DESCRIPTION OF THE PREFERRED EMBODIMENTS

It is desirable in flowmeter transducers to protect the tip of the transducer against moisture and corrosion by providing a protective stainless steel cover; however, this may adversely affect the performance of the transducer. The present invention aims at adding a metal cap to the plastic tip of a conventional plastic covered transducer without degrading its acoustic performance. Good sensitivity is obtained by using approximately half-wavelength thicknesses for the metal and plastic layers. Bandwidth is increased by adjusting thicknesses so that the layer transmission peaks and the piezoelectric element response peak occur at three slightly different frequencies. Where most transducers consist of a plunger, or support, and an active portion (including the piezoelectric member with the electrical leads connected thereto and passed through the support), the invention aims at manufacturing metal encapsulated transducers with good reproducibility and predetermined acoustic characteristics.

Five assembly procedures are described hereinafter for uniting a metal enclosure with the other parts of the transducer generally by bonding; however, when uniting the support, or plunger, to the metal enclosure or thimble, electron-beam welding is used. Variations in the procedure include making the active portion of the transducer integral with the support, or plunger, and selecting different assembling steps.

The invention is particularly suitable for flowmeters used to detect vortices in terms of modulation of an ultrasonic beam. Two transducers are positioned and directed substantially transversely to the flow axis, with one serving as transmitter and one as receiver. Generally a continuous wave (CW) mode of transmission is used, wherein a single frequency sine wave is applied by a drive circuit to the transmitting transducer. Therefore, the two transducers must have good sensitivity at the operating frequency. However, the bandwith of transducer frequency response should not be too narrow because a narrow bandwidth could cause the received signal level to be excessively dependent on differences in the driver circuit frequency between individual sets of electronics, or on physical differences of the transducers inherent in their construction. It may also be required that both connections to the transducer element be electrically isolated from the metal housing.

In the past the immersed tip of the transducer including the active element was encapsulated by an epoxy resin and no further protection was sought. However, in such case, the epoxy was exposed to moisture and corrosion. Besides, as a material, epoxy is not sufficiently rugged for certain applications.

The present invention proposes to enclose the epoxy covered tip of a transducer in a metal enclosure preferably of stainless steel. However, the acoustic window of stainless steel interposed in front of the piezoelectric member causes a problem as a result of acoustic impedance mismatch and uncontrolled bond characteristics. It is important that the metal enclosed transducers meet environmental and performance requirements. Moreover, this must be achieved at a reasonable cost.

It is further required that the metal enclosed transducers obtained from manufacture be electrically and mechanically interchangeable. Another requirement is that acoustic reflections, and hence standing waves, between transducer faces be kept small.

The present invention basically proposes to cover the epoxy resin covering the active portion of a transducer with a metal enclosure, or thimble in such a way that acoustic performance is optimized.

Figure 1:
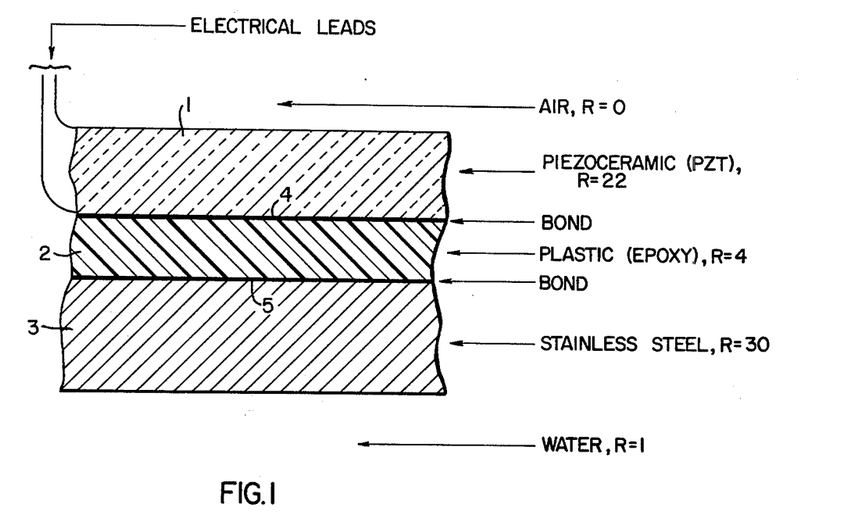
FIG. 1 shows specifically three layers characteristic of the metal enclosed transducer according to the present invention.

The metal enclosed transducer according to the present invention can be represented in its basic form as the multilayer transducer of FIG. 1. A piezoelectric member 1 is bonded to a plastic layer 2, which in turn is bonded to a metal acoustic window 3. The plastic layer 2 and the bonds 4, 5 could be made of the same, of similar, or of different plastic materials, preferably of epoxies. The frequency response depends on the thickness of the three layers. The piezoelectric element 1 is backed by air. The window 3 of the metal casing, or thimble, or the transducer is shown in contact with the transmitting medium, e.g., water, assuming the transducer is used in a flowmeter for a water pipe, or conduit.

Figure 2:
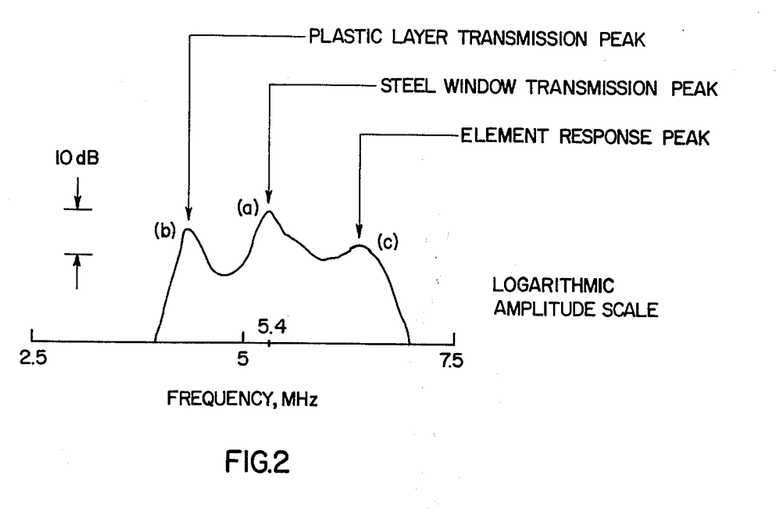
FIG. 2 shows the typical frequency response of the metal enclosed transducer of FIG. 1.

The present invention proposes an optimal choice of the respective layer thicknesses. The relative acoustic impedances of the various materials in FIG. 1 are $R = 0$ for the air; $R = 22$ for the piezoelectric member 1 (for instance of piezoceramic material); $R = 4$ for the plastic layer 1 (an epoxy); $R = 30$ for the metal windows (stainless steel) and $R = 1$ for water. These impedances are successively low, high, low, high, low. Thus, each solid layer is sandwiched between materials which are significantly different in acoustic impedance from the layer material, with the acoustic impedances of both adjoining materials being either higher or lower than the layer material. As generally known, for such boundary condition, maximum transmission through each layer occurs near frequencies for which the thickness is an integral number of half-wavelengths. It is an object of this invention to establish the transmission peaks for the piezoelectric member, the plastic layer, and the acoustic window at different frequencies, but near the desired operating frequency, which is illustrated as 5.4 MHz, in FIG. 2, so that the overall response curve is broadened as shown. The relative location of the peaks shown (metal window peak (a) at the center frequency, plastic layer peak lower (b), and element peak higher (c)) is typical.

Figure 3:
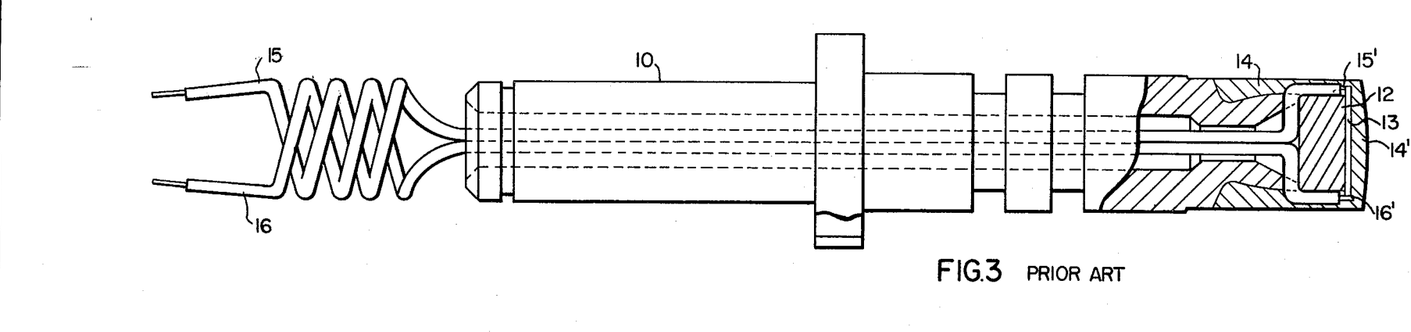
FIG. 3 shows a typical prior art transducer that can be used in manufacturing the metal enclosed transducer according to the present invention.

FIG. 3 shows the internal construction of a transducer of the prior art considered most suitable to be used in the context of the present invention because it satisfactorily provides mechanical support and protects well the electrical leads to the piezoelectric member. As FIG. 3 shows, the piezoelectric member 13 rests on a syntactic foam disc 12 which in turn rests on the end portion of a long metallic part 10 called a plunger. Electrical leads 15 and 16 pass through longitudinal opening 8 in the plunger 10 and through grooves in the foam disc 12. One lead is soldered to each side of the piezoelectric member at 15′, 16′. Thin bands of epoxy are used to hold the parts in position for encapsulation, to seal the edges of the various joints, and to cover the wires in the grooves. There is no bond and hence negligible acoustic coupling between the piezoelectric member and the backup member, or foam disc 12. Thus, the piezoelectric member is effectively air backed, which is desirable for high sensitivity. The internal parts, including the front portion of the plunger, are encapsulated in an epoxy 14, which in this conventional design completes externally the transducer assembly and provides the acoustic window exposed to the acoustic wave transmitting fluid. Variations from such internal structural arrangement are possible. The term "element assembly" used hereinafter is intended to designate the combination of at least the following parts of the transducer: the piezoelectric member (13 on FIG. 3), the backup member (12), the electrical leads (15, 16) soldered to the piezoelectric member and passed, laterally of the backup member, to the rear through a longitudinal opening in the support or plunger, (8 on FIG. 3), and the front end, or tip of the plunger (10).

Figure 4A:
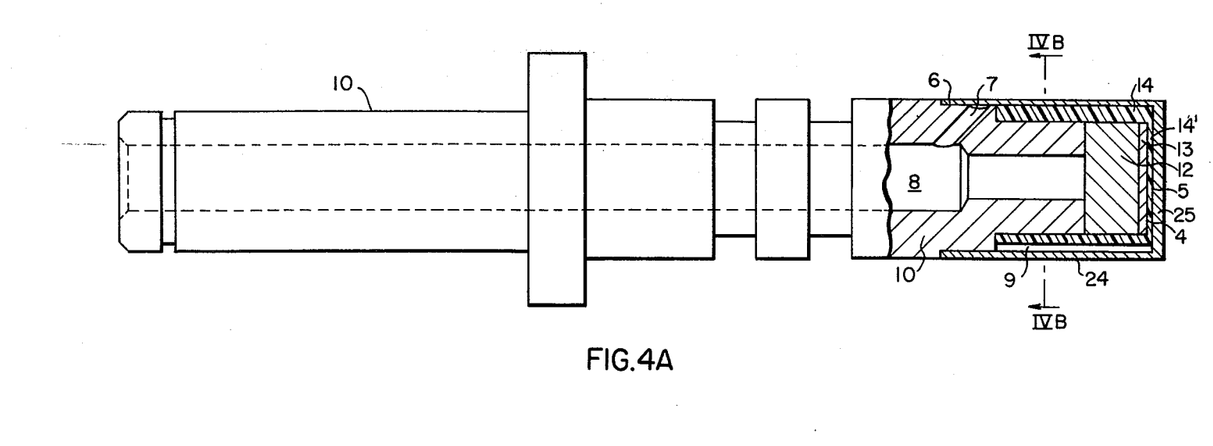
FIGS. 4A, 4B show two views of one embodiment of the transducer according to the present invention.
Figure 4B:
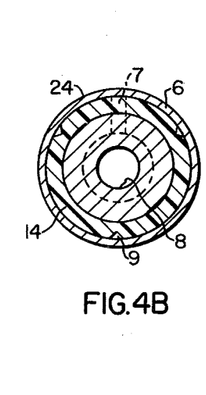

FIGS. 4A and 4B provide two views of the transducer according to the present invention derived from a prior art design, shown in FIG. 3, by the adjunction of a metallic capsule, or thimble 24 on the cured epoxy resin 14 after grinding or machining to dimension. The epoxy resin provides an insulating layer 14′ between the piezoelectric member 13 and the window 25 of thimble 24. Once in place, transmitting thimble 24 abuts at 6 against a shoulder of the metallic support, or plunger 10. A bonding agent 5 is applied and cured between the front face of the epoxy resin layer 14′ and the back face of the thimble window 25. Indeed, as known from the prior art design of FIG. 3, electrical leads 15, 16 have been initially connected to the piezoelectric member and passed through the longitudinal opening 8 of the plunger 10.

Figure 5A:
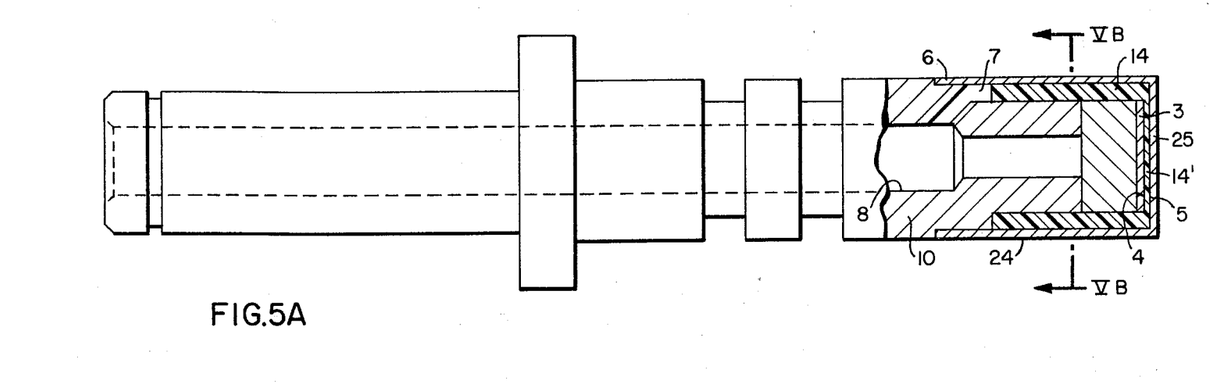
FIGS. 5A, 5B show two views of a second embodiment of the transducer according to the present invention.
Figure 5B:
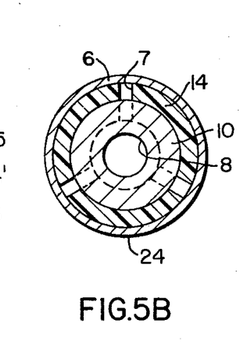

FIGS. 5A and 5B provide two views of another embodiment of the present invention in the case where instead of mounting the capsule, or thimble 24 on a cured coating of epoxy resin, the intermediary layer of epoxy resin 14′ is obtained by potting with epoxy resin and curing in situ.

Figure 6A:
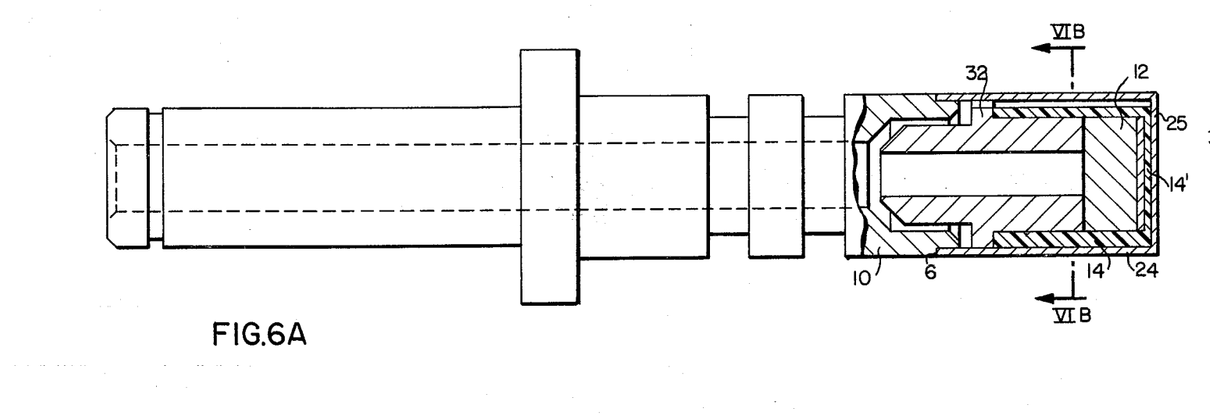
FIGS. 6A, 6B show two views of a third embodiment of the transducer according to the present invention.
Figure 6B:
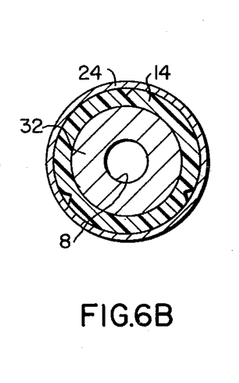

FIGS. 6A and 6B correspond to the embodiment of FIGS. 4A, 4B, with the difference that the support 10 now includes two supporting members, the plunger proper 10 and a base member 32. The "element assembly" of the transducer includes the backup member 12 and the piezoelectric member 13 and the base member 32. The element assembly is coated with cured epoxy resin, which is machined before mounting of the thimble 24. Thereafter, the thimble is welded to the plunger proper 10.

Figure 7A:
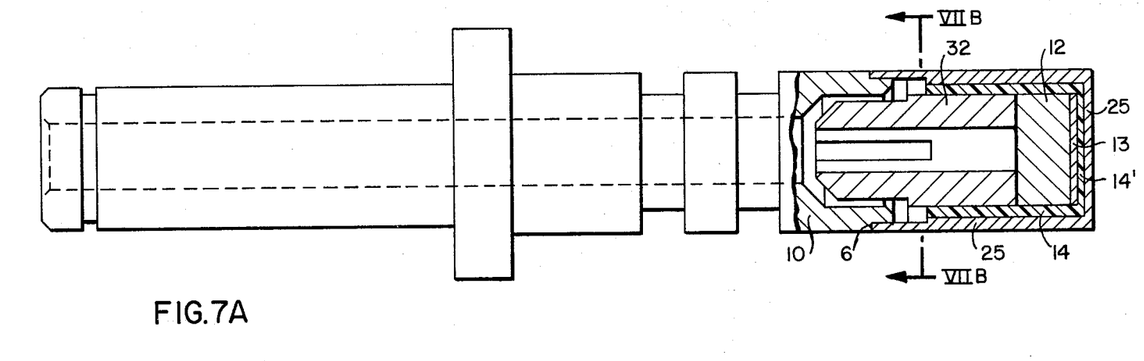
FIGS. 7A, 7B show two views of a fourth embodiment of the transducer according to the present invention.
Figure 7B:
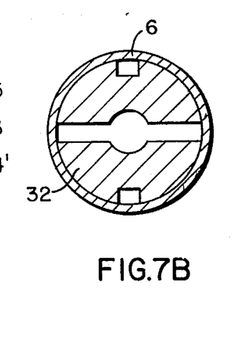

FIGS. 7A and 7B correspond to the embodiment of FIGS. 5A, 5B, and are similar to FIGS. 6A and 6B to the extent that a base member 32 is provided between the plunger proper 10 and the active portion of the transducer (backup member 12 and piezoelectric member 13) to form the element assembly. In the case of the embodiment of FIGS. 7A, 7B, however, the epoxy resin is poured in then cured in situ between the thimble 24 and the element assembly including the base member 32 and the transducer members 12 and 13, with the leads in.

If, as proposed with the present invention, a transducer is intended having a metal acoustic window, a very thin bond could be used between the piezoelectric element 13 and the window in order to give a wider band frequency response as desired, but this would make it difficult to provide an isolated front connection. In accordance with the present invention, a thicker half-wavelength layer 14', shown in FIG. 4A, is instead proposed, thus allowing space for the soldered front lead to the piezoelectric member 13. Previous metal enclosed transducers were assembled with thin bonds of conductive adhesive, which provided a front connection. This technique, however, does not meet the electrical isolation requirement. Another advantage of a thicker bond or a thicker plastic layer is greater strength in the presence of mechanical and thermal stresses. The present invention also proposes to create such thicker bonding through the use of filled plastic materials, such as epoxies, like Stycast 2762FT (Emerson & Cuming, Inc.). the particle size of such materials would normally rule out their use in thin bonds.

The front surface of the thimble is preferably provided with a slight conical taper in order to reduce reflections between transducers which cause standing waves in the CW mode. The taper also has a desirable effect on frequency response in that the window thickness is spread over a range of values and hence resonance peaks (at half-wavelength multiples) are spread out. The window resonance peak is the predominant one and, should the window faces be parallel, it would be sharper than the resonance peak of the piezoelectric member or of the bond layer. Hence, this window resonance is the preferable one to be spread out. In practice, the window may be given a half wavelength thickness or a one wavelength thickness as the nominal 5.4 MHz response frequency.

The transducer according to the present invention may be assembled by five typical assembly procedures. These five different procedures indicate two basic approaches:

1. The plunger is part of the element assembly (Procedures A and B); or the element assembly is separate from the plunger (Procedures C, D, and E).

2. The element assembly is encapsulated in epoxy then bonded into the thimble (Procedures A and C); or the unencapsulated element assembly is potted directly into the thimble (Procedures B, D and E).

In all instances, the thimble is welded to the plunger, preferably by the electron-beam method, after the element assembly has been bonded inside. An exception would be when, instead of a thimble 24, the active portion of the transducer is encased integrally within the support, or plunger 10. After welding, the stem of the plunger is partially filled with epoxy to seal out moisture from the back. This epoxy is preferably injected well down in the stem using a syringe.

These five procedures, A though E, are illustrated by FIGS. 4 to 7. In all figures the element assembly is shown in simplified form; the leads are not shown. When nothing is said, the internal construction is basically the same as in FIG. 3.

Procedure A (FIGS. 4A, 4B)

Starting with the prior art design transducer apparatus having the epoxy resin cured at the tip of the plunger 10 and surrounding the backup member 12 and piezoelectric element 13 in place, the latter having the electrical leads 15, 16 connected, the following steps are performed:

1. grinding the epoxy portion of the plunger. This step may include: machining and/or grinding the shoulder portion (shown at 6 in FIG. 4A) of the metallic wall of the plunger where the thimble is intended to rest in position for welding; drilling holes of specified diameter;

2. Applying a bonding agent 5 to thimble 24 and the element assembly, and bringing together until the thimble abuts against plunger 10;

3. curing the bonding agent in situ (using direct heat);

4. welding thimble 24 to plunger 10, preferably by electron-beam welding.

This procedure amounts very much to simply adding a metal thimble to the previous transducer design. Starting with the tip of the element assembly called a plunger, after encapsulation with epoxy resin, the outside dimensions are modified, as shown, by reducing the diameter in order to fit the internal dimension of the thimble. The epoxy is tooled by grinding to specific dimensions. Three vent grooves are added in the operation. A vent hole is drilled though the metal. The epoxy resin used is preferably one known on the open market: Stycast 2762FT (Emerson & Cuming, Inc.). The thickness in front of the piezoelectric element is selected 0.012 in. so as to be a half-wavelength at approximately 5 MHz. The shoulder on the metal portion is so located that the lip of the thimble would butt against it, leaving a 0.001 to 0.002 in. (or 0.025 to 0.051 mm) gap for the bonding agent (Eccobond 104) (Emerson & Cuming, Inc.).

The three V-grooves and the bevel in the epoxy are provided in order to facilitate the escape of air and excess bonding agent and to provide space for some excess bonding agent. The amount of bonding agent should be controlled to prevent it from reaching the weld joint. The 0.031 in. (or 0.787 mm) diameter hole in the metal thimble allows for the escape of gas during welding, since this is done after the bonding agent is cured.

Procedure B (FIGS. 5A, 5B)

Taking prior art design transducer apparatus without epoxy resin 14, thus consisting only of the element assembly of the piezoelectric member and backup member in place on the plunger 10 and connected to the electrical leads 15, 16, and:

1. machining the plunger shoulder portion 6 of the plunger 10 where the thimble is intended to rest;

2. locating and drilling holes in the plunger;

3. machining slots connecting the holes;
4. pouring uncured epoxy resin into the thimble 24 then placing the element assembly and thimble in the upright position and assembling until the wall of the thimble abuts against the shoulder 6 of the plunger;
5. curing the epoxy in situ;
6. joining the thimble 24 to the plunger by electron-beam welding.

In this case, encapsulation of the element assembly in Stycast 2762FT prior to adding the thimble as done in Procedure A is omitted. All of the epoxy 23 in front of and around element assembly 21 is added in one step. The shoulder in the plunger portion is located so that a space of 0.012 in (or 0.3048 mm) is left between the element and the inside window surface of the thimble 22. Three 0.031 in. (or 0.7874 mm) diameter vent holes and three slots leading to them are provided in the metal portion of Item 1. The required amount of liquid epoxy Stycast 2762FT is placed in the thimble, the element assembly is inserted from above, and heat is applied to cure the epoxy, after which the welding is done.

Both Procedures A and B as shown use the design of FIG. 3 with only minor modifications, as the element assembly. One difference, however, is that the plunger is Type 304 stainless steel instead of type 303 so that it can be welded.

Making the element assembly separate from the plunger has the following advantages:
1. Critical dimensioning of the lengths from the front of the element assembly back to the shoulder and of the length of the thimble is avoided. In Procedures A and B, it is required that the weld joint close tight while maintaining a precise internal end gap.
2. Possible stress on the bond due to welding distortion is eliminated because the element assembly is independent of the plunger.
3. The bonding step is easier because the parts can be observed from the open end of the thimble. Excess epoxy can be cleaned off before and after curing to avoid any undesirable effect on the weld.
4. An internal splice to provide larger wires for external leads than those used for connection to the element can be readily made before the welding is done.

Procedure C (FIGS. 6A, 6B)

The support for the transducer active portion includes two supporting members. One supporting member is the plunger proper. The other supporting member, or base member 32, is adapted to fit within the plunger with a definite gap therebetween. The base member 32 is, like the plunger tip of the prior art design transducer apparatus, used for Procedure A hereabove, provided with cured epoxy resin surrounding the backup member and piezoelectric element in place, the latter having the electrical leads connected. With the base member 32 so assembled and united to the active portion of the transducer, the following steps are followed:

1. grinding the epoxy portion of the element assembly;
2. applying a bonding agent between the thimble and the cured epoxy face;
3. curing the bonding agent in situ (using direct heat);
4. placing the thimble onto the ground surface of the element assembly; and
5. placing the plunger proper 10 in abutting relation to the base member 32 and the thimble 24; and welding thimble to plunger, preferably by electron-beam welding.

This procedure corresponds to procedure A in that the element assembly including a base member 32 is encapsulated and machined, then bonded with a separate bonding agent into the thimble 24. The cylindrical surface of the element assembly is grooved and the front edge is beveled to facilitate flow of air and excess epoxy from the thimble when the element assembly is inserted. The back end of the base member has a beveled surface and the opposite recess in the front end of the plunger 10 also has a beveled surface to provide a smooth flow path when filling the back of the transducer through longitudinal opening 8 with epoxy after welding.

Procedure D (FIGS. 7A, 7B)

This procedure is generally similar in its steps to the Procedure B, the different being that instead of the plunger 10, it is a base member 32 which is used to form the element assembly to be joined to the thimble 24 containing uncured epoxy resin. Then, the epoxy resin is cured in situ. The last step consists in joining the thimble 24, not to the base member but, as in Procedure B, to the plunger proper 10, which has been mounted in abutment to base member 32 with the electrical leads in position. Electon-beam welding is used in this last step.

According to this procedure, the thimble 24 is made with a step in the inside wall which serves to space the element assembly away from the inside surface of the thimble window. This procedure corresponds to Procedure B in that the element assembly is unencapsulated and all the epoxy is added during the bonding step. Grooves in the largest diameter portion of the element assembly allow excess epoxy to flow back from the front of the thimble. The groove which cuts completely through the back end of the element assembly allows excess epoxy to flow down inside the element assembly rather than build up too close to the thimble lip and possible interference with fitting thimble to plunger. Using the correct amount of epoxy can also avoid this problem and the cross groove could be eliminated.

Figure 8:
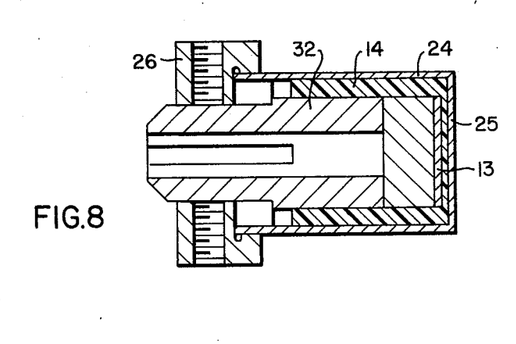
FIG. 8 illustrates a special fixture that can be used in assembling the transducer of FIGS. 7A, 7B.

Procedure E (FIG. 8)

This procedure generally is similar to procedure D, but it differs from it in that a fixture, or jig 26 is used to put the element assembly in the right geometrical relation with regard to the thimble 24 before pouring the uncured epoxy resin, then curing the same in situ. The fixture 26 is taken away and the thimble, united to the element assembly, is mounted on the plunger proper 10 for the last procedural step, e.g., electon-beam welding.

The procedure also involves potting the element assembly directly into the thimble 24, but it eliminates the need for an accurately positioned step in the thimble wall. Instead, the desired front epoxy layer thickness is obtained by the use of a fixture 26, as shown in Group 3 of FIG. 7. The fixture is positioned, then temporarily attached to the element assembly by means of set screws (not shown) in the threaded holes. The fixture rests on the thimble lip, suspending the element assembly in the correct position. A preferred method of positioning the fixture is to place shims of the desired total thickness (nominally 0.012 in. or 0.304 mm) in the bottom of the thimble, insert the element assembly, seat the fixture on the thimble lip, and tighten the set screws. The shims are removed before potting.

Additional steps may be used as follows:

1. All parts to be bonded are cleaned in solvent and rinsed in distilled water.
2. Inside thimble surface is uniformly roughened with a fine sand blaster such as the S.S. White Airbrasive Tool.
3. The epoxy surfaces of the element assembly for Procedures A and C are also lightly sand blasted.
4. Exposed metal surfaces on the element assembly and the surfaces inside the plunger front recess are also lightly sand blasted for good bonding.
5. In Procedures A and C, a small drop of epoxy is placed at the center of the inside thimble surface or element assembly face. Air is forced out as the drop spreads under compression, to produce a void-free bond.
6. Parts are kept heated to about 140°F to reduce epoxy viscosity and facilitate its flowing out.
7. Spring or weight force is maintained between parts during bonding.
8. Cured epoxy which interferes with fit or parts for welding is removed from the lip of the thimble 24, preferably by fine sand blasting.
9. A lead splice between the wire attached to the element and a heavier lead wire is made by soldering, then coating the splice with epoxy and curing. The epoxy provides insulation, a barrier to moisture carried down the wire insulation, and strain relief when the unit is backfilled.
10. Welding should be done with the minimum heat necessary to provide full penetration (0.015 in. or 0.381 mm).
11. If Procedures A or C are used, epoxy face thickness can be determined before bonding by measuring the frequency response of the element assembly. when coupled to water, a low acoustic impedance material, the epoxy layer is between high and low acoustic impedances and hence maximum transmission occurs when face thickness is an odd multiple of quarter wavelengths. Thus, thickness can be easily determined and the frequency of the epoxy layer peak for the completed transducer can thus be determined. The λ/2 peak occurs at twice the frequency of the λ/4 peak, where λ is the wavelength. The frequency response can be measured by using acoustic signals, or by electrical admittance or impedance measurements. Face thickness can then be modified before bonding to get desired frequency characteristics. Bond thickness and sound velocity must be taken into account in estimating the response peak of the epoxy layer after bonding.
12. The thimble and the front end of the plunger can be made oversized in outside diameter in order to allow for final machining after welding. In practice, for one transducer, these diameters actually were 0.006 in. (or 0.152 mm) larger than the final dimension. By final machining a smooth surface could be obtained with no indication of the weld. In any case, the weld bead is usually raised and has to be removed, if the transducer is to fit closely into a hole.

The invention offers a successful solution to the problem of manufacturing reliable transducers of well defined characteristics at a resonable cost. The three-part design of Procedures C, D and E has particular advantages in ease of assembly, avoidance of critical dimensioning, and the ability to bring out heavier electrical leads. Sealing the bonding epoxy from air and moisture should maximize the life of the transducer and provide high temperature capability. The high compressive strength built in by the internal material gives a high pressure capability to the transducer.

The invention is applicable to transducers of various sizes and shapes.

The welding operation is important whenever the plunger geometry is not suitable for installing all parts from the back and it allows for machining the inside window surface accurately. When the thimble is provided with a flange portion for sealing and support, the thimble can be made such as to be the entire transducer housing. A vortex flowmeter basically does not require a long plunger.

The recess into which the element assembly is bonded or potted can be machined directly into the flow section, thus avoiding penetration of the wall.

Other bonding and encapsulating agents than epoxy resin can be used.

Materials and details of design or construction can be changed within the scope of this invention, to suit a variety of applications and to simplify construcion. For example, the shape of the grooves, tolerances, and assembly fixtures can be changed to suit the particular application.

The bandwidth may be increased at the expense of sensitivity by bonding an acoustic absorber such as tungsten-filled epoxy to the rear surface of the element.

A resonant member, e.g., a half-wavelength layer, may be bonded to the element rear surface to provide another peak in response. It would then replace the synthetic foam backing piece earlier described.

I claim:

1. A transducer for the transmission of acoustic energy substantially at given frequency through a transmitting medium, comprising:
   a piezoelectric member having a front and a back face;
   a metallic capsule having a front window interposed between said transmitting medium and said front face; and
   a plastic material interposed between said piezoelectric member and said capsule and forming a plastic layer between said front face and said window; wherein said piezoelectric member, said plastic layer and said capsule window have thicknesses which are substantially equal to the half wavelength of the acoustic wave at said frequency therethrough, each of said thicknesses defining a corresponding peak frequency, wherein each peak frequency is slightly different from the two others, the central frequency being the one of said front window, whereby a broadened frequency response characteristic is otained about said given frequency.

2. The transducer of claim 1 with said capsule being of stainless steel.

3. The transducer of claim 2 with said plastic material being an epoxy resin.

4. The transducer of claim 3 with said plastic layer being bonded on either face thereof.

5. The transducer of claim 3 including a backup member associated with said back face of said piezoelectric member.

6. The transducer of claim 5 including a thin film of air interposed between said back face and said backup member for providing acoustic isolation therebetween.

7. The transducer of claim 6 with means for physically and rigidly connecting said backup member and said piezoelectric member laterally of said thin film of air.

8. The transducer of claim 5 with said backup member being an acoustic absorber bonded to said piezoelectric member.

9. The transducer of claim 8 with said acoustic absorber consisting of tungsten-filled epoxy resin, said tungsten-filled epoxy resin being bonded to said back face of said piezoelectric element laterally thereof.

10. The transducer of claim 5 with said backup member consisting of a resonant member of a half-wavelength layer of material bonded to said back face of said piezoelectric member.

11. The transducer of claim 5 with said backup member consisting of solid foam material, the pores thereof containing air.

12. The transducer of claim 6 with said backup member consisting of solid foam material, the pores thereof containing air.

13. The transducer of claim 6 with said piezoelectric member being of a piezoceramic material having relative to water an acoustic impedance of the order of 22; said plastic layer being an epoxy resin having relative to water an acoustic impedance of the order of 4 and said capsule window being of stainless steel with an acoustic impedance of the order of 30 relative to water.

14. The transducer of claim 5 with said epoxy resin extending between said backup member and said piezoelectric member on the one hand, and said capsule on the other hand, laterally of said member.

15. The transducer of claim 14 with said epoxy resin being bonded at least to said capsule and said piezoelectric member.

16. The transducer of claim 15 further including a metallic support for said backup member and said piezoelectric member, with said epoxy resin being bonded to said metallic support and said capsule being connected to said metallic support.

17. The transducer of claim 16 with said capsule being electron-beam welded to said metallic support.

18. The transducer of claim 17 further including electrical leads connected to said piezoelectric member and passed through said metallic support.

19. The transducer of claim 13 with said epoxy resin being cured before bonding.

20. The transducer of claim 13 further including a metallic support for said backup member and said piezoelectric member, and with said epoxy resin being cast in situ to unite said metallic support, backup members, piezoelectric member and capsule.

21. The transducer of claim 20 with said capsule being electron beam-welded to said metallic support.

22. The transducer of claim 20 further including electrical leads connected to said piezoelectric member and passed through said metallic support.

* * * * *